Aug. 28, 1945.   W. H. COLBERT ET AL   2,383,469
METHOD OF CLEANING AND COATING GLASS, PLASTICS, AND OTHER SURFACES
Filed Dec. 15, 1943

INVENTORS
William H. Colbert.
Arthur R. Weinrich.
BY
ATTORNEYS

Patented Aug. 28, 1945

2,383,469

UNITED STATES PATENT OFFICE 2,383,469

METHOD OF CLEANING AND COATING GLASS, PLASTICS, AND OTHER SURFACES

William H. Colbert and Arthur R. Weinrich, Brackenridge, Pa., assignors to Libbey-Owens-Ford Glass Company, Toledo, Ohio, a corporation of Ohio Application December 15, 1943, Serial No. 514,328

6 Claims. (Cl. 117—54)

The present invention relates to a method of cleaning and coating glass, plastics and other surfaces. It has to do particularly, although not exclusively, with the cleaning of glass, plastics and other surfaces which are to be used to produce mirrors or reflectors by the application to the surface of the clean glass, et cetera, of a reflective coating consisting of a suitable metal. It may also be used to prepare clean glass prior to the application of other coatings, such as low reflective coatings or coatings for other purposes.

Considerable difficulty has been experienced in the past with previous methods and apparatus for producing mirrored surfaces upon glass particularly with certain kinds of metals which are desirable for use in the production of mirrored surfaces and especially in an effort to produce such a mirror coating which would adhere or stick to the glass with any degree of permanency. The production of mirrors for outdoor use in tanks and airplanes has been of particular importance in emphasizing the need of clean glass prior to coating to secure adhesion that will withstand such outdoor usage. The poor adhesion and pinholing found in ordinary mirror glass has been found to be due not alone to the difficulty in securing thoroughly and completely clean glass but also to the difficulties in preserving a clean glass surface up to the time of applying the coatings to the glass. The poor adhesion and pinholing are due largely to the existence of minute particles of foreign material such as dirt, grease, fatty acids, lint, et cetera, on the surface of the glass to which the coating is to be applied. While these may be removed by cleaning operations, clean glass rapidly absorbs grease, lint and other substances from the air and during drying after cleaning becomes thus contaminated as well as being contaminated by lint during the time it is exposed to the air.

It is well known that while a piece of glass may appear to the naked eye to be thoroughly clean and free of all foreign matter and substances, it is extremely difficult to thoroughly clean the surface of the glass so that it will lend itself properly to the reception of a permanent mirrored surface. It is a well known fact that only glass having a completely cleansed surface or surfaces is desirable for the application to and reception of a surface coating of reflective material. Glass which is perfectly clean gives no visible pattern when the breath is blown on the same and if water is applied thereto the water wets the glass as a thin uniform film and does not stand up in discrete globules. Clean glass can be characterized also in another way in that a stiff whisker of glass or glass fiber, when drawn over a completely clean glass surface, will catch and seize on the clean glass surface due to a high coefficient of friction whereas, if the glass is dirty as is true with glass normally, such a glass fiber will slip across the surface without catching. It is presumed that the slippage which occurs with glass surfaces which are normally soiled is partly due to a minute film of grease as also indicated by the poor and non-uniform wetting of such by water. We further feel that the grease is in many cases chemically attached to the glass in a form approximating the metallic soaps. Thus, fatty acids are found to contaminate a glass surface and to be extremely difficult to remove. These fatty acids apparently attach themselves to the calcium, magnesium, aluminum and sodium atoms lying in the glass surface and constituting part of the glass.

By the means set out in the following description, we have been able to produce mirrors and other articles such as those carrying low reflective coatings in very large quantities for use in various vehicles of war and in the optical elements used in such, for example, bomb sights, and have been able to provide such articles free from pinholes and free from failures in the coatings in such articles by reason of loosening of the coatings. We not only have been able to satisfactorily clean glass but more particularly have set out a means for maintaining glass in an absolutely clean and lint-free condition up to the time of applying to it the reflective or other coatings.

It is, therefore, one of the objects of our present invention to provide an improved method whereby the surface or surfaces of a piece of glass, plastic or other support material may be thoroughly cleansed and relieved of all foreign particles or substances to secure the permanent adhesion thereto of a mirrored surface.

Another object of our invention is to provide an improved method or process for cleaning the surface or surfaces of a piece of glass, plastic or other material so that they are capable of receiving a permanently attached reflective surface coating and to treat the cleansed surface in such a manner as to maintain it in thoroughly cleansed condition until such time as it is desirable to apply a reflective surface coating thereto.

A further object of our invention is to provide an improved method or process whereby the surface of a piece of glass or plastic may be completely free of foreign particles and substances and maintained in its cleansed condition prior to use.

A further object of our invention is to provide an improved method or process whereby the surface of the piece of glass or plastic may be completely freed of foreign particles and substances and maintained in its cleansed condition until such a time as it is desirable to apply a low reflective coating.

Another object of our invention is to provide an improved method whereby the thoroughly cleansed surface of a piece of glass, plastic or other support material may be maintained clean by the application thereto of a removable protective coating or thin film of a substance which lends itself to easy removal by oxidation and/or evaporation.

A further object of our invention is to provide an improved method or process whereby the surface or surfaces of glass articles may be thoroughly and completely cleansed and then protected from contamination by the application thereto of a thin film of an easily removable substance which may be removed therefrom to place the surface of the glass in readiness to receive a high reflective surface coating, a low reflection coating, or other types of coatings.

The foregoing and other objects and advantages of our invention will appear from the following description and appended claims when considered in conjunction with the accompanying drawing forming a part of this specification wherein like reference characters designate corresponding parts in the several views.

Figure 1:
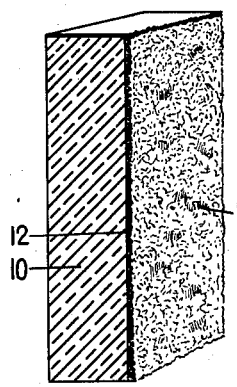
Figure 1 is a fragmentary perspective view of a piece of glass taken from stock and having a face or surface thereof contaminated with dirt or grease or other foreign particles and substances.
Figure 2:
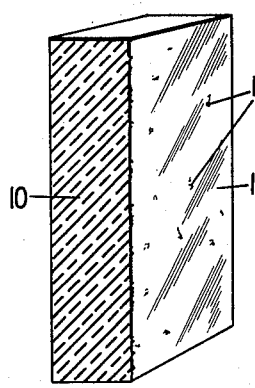
Figure 2 is a view similar to Figure 1 showing the glass after its contaminated surface has been initially cleansed by the application thereto of a suitable chamical cleaning solution.
Figure 3:
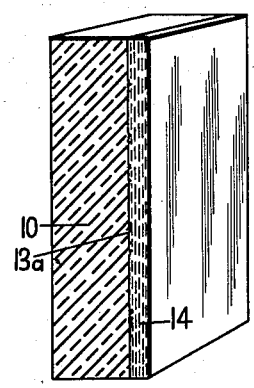
Figure 3 is a view similar to Figures 1 and 2 showing the same piece of glass after the initial cleaning and after the cleansed surface thereof has had applied thereto an application of a solution or emulsion containing a suitable mineral oil or other high boiling organic liquid.

In any of the above views the glass may be replaced by plastic, porcelain, or other materials, such as a metal, which it is desired to maintain in a clean surface condition prior to the application of a coating thereon in a high vacuum by thermal evaporation or by sputtering.

Before explaining in detail the present invention, it is to be understood that the invention is not limited in its application to the details of construction and arrangement of parts illustrated in the accompanying drawing since the invention is capable of other embodiments and of being practiced and carried out in various ways. It is to be understood also that the phraseology and terminology employed herein is for the purpose of description and not of limitation. It is not intended to limit the invention contained herein beyond the requirements of the prior art.

Generally speaking, our improved method or process of cleaning glass, plastic, metal or other materials comprises the steps of preliminarily cleaning the surface or surfaces of the glass, etc., by the use of a suitable chemical solution to remove grease or other foreign matter therefrom, rinsing in distilled water and draining dry, applying to the clean surface or surfaces of the glass, plastic, et cetera, by wiping or smearing onto the surface or in any other suitable manner, a coating of a suitable substance or material containing a mineral oil or other liquid boiling in the range of 200° to 400° C. in a suitable readily volatile solvent, or other carrier, or applying these upon a rubbing body, then removing most of the applied coating by a series or succession of wiping operations performed by the use of several clean lintless rags and of absorptive powders to remove all of said applied coating with the exception of a very thin layer or film of the mineral oil or high boiling liquid therefrom, which is allowed to remain on the surface to protect the clean surface of the glass from contamination by dirt, lint, grease or any other foreign particles or substances present in the air, which might become lodged upon said surface, and then placing the thoroughly cleansed glass, whose surface is protected by the film and thus kept clean, in a storage space for future use. If it is desired, at this stage of the process or method, to apply a mirrored or other surface coating to the clean and protected glass or other support material surface rather than to place the cleansed glass or other support material in storage, the piece of glass or other support material is preferably now placed inside a suitable vacuum chamber or space and subjected therein to a high vacuum and to a glow discharge and bombardment to remove, by oxidation and/or evaporation, the thin protective film of mineral oil or other high boiling liquid from the clean surface thereof, as well as any foreign matter or lint which may have been picked up by said protecting film, and also in the same vacumizing chamber or compartment, to subject the freshly cleansed surface of the glass thus exposed, to a thermal evaporation device to apply, by deposition, a reflective coating to the freshly exposed cleansed surface of the glass, or if desired, we may apply a coating to the glass or plastic to secure relatively low reflection qualities, or other types of coatings.

Referring now to the drawing, the glass article or piece of glass, plastic or other support material shown in Figures 1 to 6, inclusive, thereof, is indicated as a whole at 10. In Figure 1 we have shown a piece of glass taken from stock and have illustrated in somewhat exaggerated manner one surface of the glass which is relatively dirty and which as shown contains particles of dirt, dust or other foreign matter, indicated generally at 11 and which has also a film of grease on the face thereof, indicated generally by the numeral 12. It is a known fact that all glass, while appearing by casual observation to have clean surfaces, is actually normally contaminated by grease and dirt which cannot generally be seen by the naked eye. This can readily be detected by blowing the breath on the glass, which gives a gray fogging effect. This grayness is due to the water condensing as small separate droplets. If the glass is completely clean no visible effect occurs when the breath is blown on the same as the water condenses as a continuous film without optical effect. As already pointed out, normally dirty glass permits a cat whisker of glass to slip across the surface readily but when the surface is thoroughly clean such whisker will catch and chatter as it is drawn across the clean glass surface.

In accordance with our improved method or process we propose to thoroughly cleanse the face or surface of the glass piece 10. The glass is preferably first subjected to a cleaning operation by the use of some suitable chemical solution or compound such, for example, as by rubbing with one containing trisodium phosphate, a fine abrasive powder, such as calcium carbonate or precipitated chalk, and a suitable wetting agent in suitable proportions. By the use of this chemical solution or compound or by using other chemical cleaners such as nitric acid, mixtures of sulfuric acid and sodium dichromate, we substantially remove all of the grease 12 and particles of dirt or other foreign matter 11 from the face or surface of the glass. After this chemical cleaning operation, we rinse the glass with distilled water and permit the glass to drain dry. If, however, some small particles or specks of foreign material, such as those indicated at 13a, are picked up after this preliminary cleansing by the cleansed glass surface, these will be removed later to present a thoroughly cleansed surface by further steps now to be described.

After the preliminary cleaning operations described above, we preferably apply to the cleansed surface of the glass, by a rubbing operation, a layer or coating of some suitable mineral oil applied in a readily volatile solvent such as toluol or, if desired, we may rub or wipe over the cleansed surface as an alternative step or treatment, a piece of soft native fiber felt such as lamb's wool, the felt being rubbed or wiped over the surface 13 of the glass to impart thereto a coating or layer of natural wool fat or lanolin. Thus, after the application of the mineral oil and a solvent or the further alternative application of natural wool fat or lanolin from the soft felt or lamb's wool, the piece of glass 10 will have on its previously cleansed face a protective coating, such as the coating 14, shown in exaggerated manner in Figure 3.

Other suitable high boiling liquids which may be applied dissolved in a readily volatile solvent or which may be rubbed onto the preliminarily cleaned glass by applying on a lintless cloth, are organic liquids boiling between 200° and 400° C. These materials are found to give us the desired slow evaporating thin protective liquid films on the cleansed glass. The liquids are non-reactive with the glass and are of such a high boiling nature that they essentially do not evaporate under ordinary room conditions except extremely slowly and therefore they remain on the glass as a protective film during storage until it is desired to use the glass. On the other hand, as will appear later, these liquids are sufficiently volatile that under very high vacuums of the order of $\frac{1}{10}$ mm. down to 10 to the minus 5 mm. they do readily evaporate and as organic liquids they may also be removed by direct oxidation of such films. As a preferred mineral oil we may apply an oil showing a boiling point distillation range under atmospheric pressure conditions ranging from 230° to 330° C. This may be applied to the preliminarily cleaned glass in a suitable volatile solvent, such as toluol, or it may be rubbed onto the glass by application thereto on a lintless rag, or it may be applied by other means to the glass. We have found that where our liquids are water-insoluble such as mineral oil, benzyl alcohol, phenyl ethyl alcohol, dibutyl tartrate or dibutyl phthalate, we may first preferably emulsify these by the use of small amounts of emulsifying agents. Such emulsions work readily on a clean glass surface and can be rubbed readily without showing any grabbing effects as the film left behind becomes reduced in thickness, whereas direct application of such liquids often gives grabbing effects and interferes with reducing the protective film to one of extreme thinness. As an example, we may take the preferred mineral oil and emulsify this with an equal quantity of water by the use of $\frac{1}{10}$ of 1 per cent of a sodium salt of a sulfated fatty alcohol. We may also use as a preferred liquid for applying to the glass, an emulsified mixture of one part lanolin and one part mineral oil boiling from 230° to 330° C. As high boiling liquids we may use benzyl alcohol of boiling point 205° C., phenyl ethyl alcohol of boiling point 220° C., octyl Cellosolve of boiling point 228° C., this material being the chemical mono octyl ether of ethylene glycol, diethylene glycol of boiling point 245° C., dimethoxytetra glycol of boiling point 275° C., diacetin of boiling point 280° C., glycerin of boiling point 290° C., dibutyl tartrate of boiling point 325° C. and dibutyl phthalate of boiling point 340° C.

After the glass 10 has been provided with a surface coating 14 by virtue of either of the several alternative applications described above to produce the coating as shown in Figure 3, the surface of the glass containing said coating is then subjected to several rubbings with thoroughly cleansed lintless rags so as to remove additional foreign particles from the surface of the glass and to increase the cleaning of the glass and to reduce the mineral oil or other high boiling liquid coating to a thin continuous protective film of mineral oil or other high boiling organic liquid, as the case may be, which continuous protective film is allowed to remain on the surface of the glass to protect it from further contamination. This thin protective film of mineral oil or other organic liquid is shown at 15 in Figure 4.

Often it is desirable as an aid in removing the excess high boiling liquid, such as the mineral oil, and to increase the cleaning action, to dust the surface with an absorptive powder such as calcium carbonate, magnesium carbonate or infusorial earth and by successive rubbings to remove all but a thin continuous layer of oil, et cetera. It is found that when rubbing with such an absorptive powder the high boiling organic liquids, in combination with the powder, exert a further desirable cleaning action on the glass.

The protective film 15 left after such rubbing and cleaning steps is so thin as to be, in may cases, and preferably, practically invisible, if not actually so. Its presence, however, may be readily demonstrated in some cases by diffraction colors showing in the same when light is reflected from such a surface. Thus, the film will be apparent due to iridescence color showing. While it is preferred that a minimum thickness of protective film be left so as to minimize the necessary evaporation and oxidation needed to later remove such film, we may use any thickness of protective film from that readily apparent as such, down to the completely invisible coating. Thus, we may have protective films which are not visible and actually thinner than one-quarter wave length of light, as shown by the lack of iridescent colors. In the case of such extremely thin protective films their presence can be demonstrated by the fact that the glass is quite slick and when rubbed with a cloth rubs easily, whereas the completely chemically clean glass surface rubs with difficulty. Furthermore, a glass cat's whisker will glide over the surface without any friction, while on the chemically clean unprotected glass not carrying the protective organic high boiling liquid, the whisker will chatter and seize. Where we use water insoluble organic liquids we may detect the films by a breath pattern and also by the tendency of water to stand up in droplets on such surfaces, although these may not show up clearly when using the extremely thin coatings. In many cases application of a hot flame to the surface will show the presence of the thin protective film either by movement of the same or by the development of a color where the flame has burnt the film off as against the areas where it remains. Interference black-and-white patterns in monochromatic light may also be used to demonstrate the presence of the thin protective liquid coatings.

Figure 4:
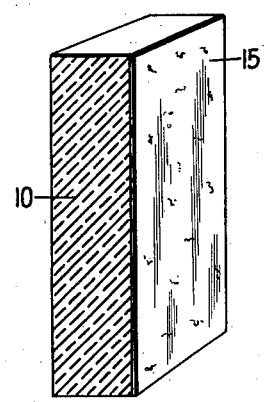
Figure 4 is a view similar to the preceding views and showing the glass subsequent to treatment by a series of wiping operations performed with clean lintless rags and showing the glass with a thin film of protective material on the face thereof.
Figure 7:
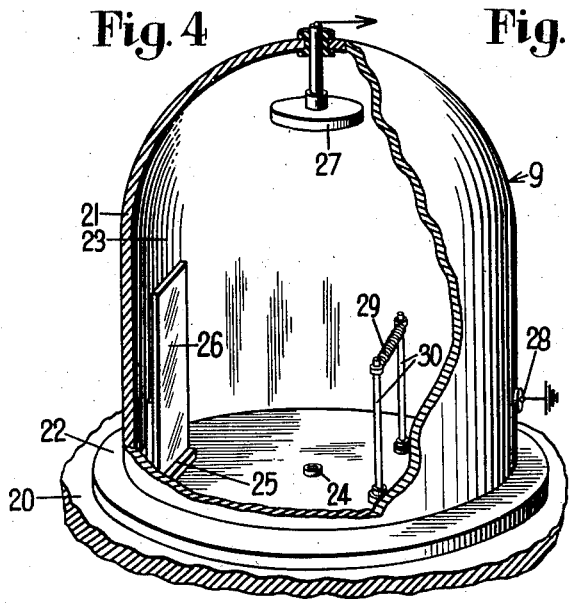
Figure 7 is a perspective view partly broken away to reveal the interior of a suitable chambered apparatus for carrying out the method or process in accordance with our invention.

If it is desired at this time to provide the clean face or surface of the glass with a reflective coating or other type coating to produce a mirror or other article, the clean glass and its protective coating as shown in Figure 4 is placed in the vacuumized chamber of some suitable apparatus, such as that shown as a whole at 9 in Figure 7. Just before the glass is placed in the vacuum for, and prior to, the operations which remove the protective coating, the protected glass is preliminarily cleaned on the surface by wiping the protective coating with a clean lintless cloth to remove any particles of dust or dirt or other contaminating matters which may have lodged on the surface of the coating layer during the storage of the glass. This wiping, however, does not remove or impair the thin protective coating 15 but merely removes loose surface dust that may have settled on such. If the glass did not carry our protective coating such a wiping would introduce dust onto the surface of an ordinary piece of glass and would prohibit the securing of a satisfactory thermal deposited coating with good adherence.

Figure 5:
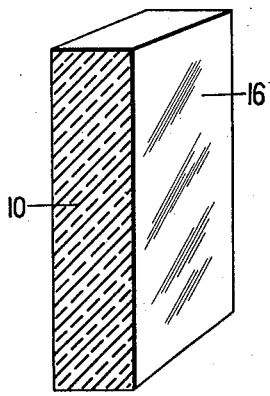
Figure 5 is a perspective view similar to the preceding figures and showing the surface of the glass after it has been thoroughly cleaned and freed of all foreign particles and substances.
Figure 6:
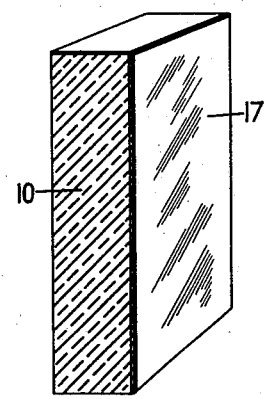
Figure 6 is a view similar to Figure 5 showing the cleansed glass after a high reflective, low reflection or other coating has been applied to its face or surface.

In the vacuumized chamber the glass is subjected to further treatment to remove the protective film 15 and thereby expose the now completely clean glass surface shown at 16 in Figure 5. In the vacuumized chamber the operations applied to the face or surface of the glass completely remove the film of mineral oil or other high boiling organic material, as well as any other foreign substances or particles which may have settled on said film and thus expose this surface in a completely clean state and in readiness to receive the reflective or other coating.

If, however, the final operations are to be delayed or postponed, the thoroughly cleansed piece of glass with its protective film 15 on the clean face thereof may be stored or put aside for future use. This has been of decided advantage in large scale operations since the cleaning and coating operations need not be synchronized. Thus, as cleaned unprotected glass rapidly becomes dirty in air even when protected by lintless covering such as Cellophane, we have found a means of insuring that our glass is clean at the time we apply our coating and have gained greatly in flexibility of production methods. Even after glass has been thoroughly cleaned it is found to rapidly become contaminated on its surface not alone by the settling of dust and lint on the same but apparently through the absorption from the air of fatty, greasy and resinous materials. These materials are present in the air and apparently originate as the greasy materials given off in the burning of fuels, such as illuminating and natural gas which give tarry, sooty materials during their combustion and similar tarry, sooty materials found in the burning of coal. Greasy materials are also thrown into the air by cigarettes and cigars and apparently they also get into the air directly from animal sources. All of these materials are alike in that they carry considerable organic acid material either as resin acids or as fatty acids. These materials are also alike in that the resin acids and fatty acids readily form metallic soaps with calcium, aluminum, sodium and other metallic elements which lie in the face of a piece of glass. Such metallic soaps are known to be highly water-resistant and it is believed that the formation of these on glass surfaces constitutes the means whereby clean glass becomes rapidly dirty when exposed to air. Such metallic soaps would be difficult to remove from glass and would reasonably explain the difficulties involved in cleaning glass. The amounts of metallic soaps which need be formed or present on the glass surface to contaminate it and alter its surface properties, particularly in preventing adhesion of mirror films applied thereto, need be only a very few molecules and consequently the low concentration of fatty and resinous acid materials present in the air is sufficient to rapidly contaminate a clean glass surface.

Referring now particularly to Figure 7, we have disclosed a suitable apparatus for carrying out the operation of removing the protective film 15 and also the operation of applying a suitable reflective or other surface coating to the clean glass. We have shown in this figure one form of apparatus which is adequately suited to the performing of the steps of removing the protective film and applying the reflective or other surface coating to the clean glass, clean plastic, or other clean support material. As shown, the apparatus comprises a supporting base 20 upon which is mounted a suitable housing 21 which, as shown, is provided with a semi-spherical or dome-like top and with a surrounding base flange or projection 22 which has a tight sealing fit with the top surface of the support 20 to provide a sealed chamber or compartment 23 within the housing walls.

The chamber 23 is adapted to be completely evacuated of air and have a high vacuum set up therein. For this purpose we provide evacuating means in the form of suitable pumps (not shown) for evacuating or withdrawing the air from within the chamber through an outlet pipe 24 which is in communication with the chamber through the base 20.

It is to be understood that when it is desired to use the clean and film-protected glass piece shown in Figure 4 for the purpose of producing a mirror or reflector or other article by the application to a face or surface thereof of a reflective or other coating, such piece of cleaned glass with its protective coating film 15 is placed upon the suitable support 25 arranged upon the base 20 of the apparatus, the glass piece being shown in supported position at 26. If desired, one or a plurality of such glass pieces 26 may be located within the chamber on the same support 25 in any desired manner.

After the glass piece 26 has been placed in position upon the support 25 on base 20 the housing 9 is placed in position upon the base to enclose the glass piece within the chamber 23. The chamber 23 is then evacuated and a high vacuum of 0.01 to 0.02 mm. of mercury or lower created therein by means of the pumps above mentioned.

The thin film of protective coating material 15 then rapidly evaporates in the high vacuum and the rapid vaporization blows off any foreign particles which may have become lodged upon this protective film after the glass surface was so protected. We may also remove the protective oil or other high boiling organic material by subjecting the glass surface to an electric glow discharge and bombardment to remove these from the surface of the glass by oxidation and bombardment. The evaporation and electric glow discharge removal of the film and any foreign material thereon may be accomplished preferably by the simultaneous use of the vacuum and the glow discharge which simultaneously evaporate and oxidize the protective film and other materials away. To perform this operation we have provided the apparatus with insulated electrodes such, for example, as that shown at 27 and we may use the wall of the chamber, if metal, as one electrode, as shown at 28. The electrodes 27 and 28 are electrically energized to produce an electric glow discharge while a vacuum of 0.01 to 0.02 mm. of mercury is being maintained in the chamber. This operation removes the protective film and foreign matter by bombardment and evaporation and oxidation. We preferably apply to the electrodes 27 and 28 a high tension electrical current of 5,000 to 30,000 volts and about 3 k. v. a. of current.

If the glass is then removed from the vacuum it can readily be demonstrated that the protective oil film has been completely removed and that the glass surface has been exposed and is in a perfectly clean condition. The glass removed at this time from the vacuum chamber shows a complete absence of any breath pattern when the breath is blown on the glass. Water wets the glass perfectly and if we attempt to rub the glass with a cloth the cloth seizes and it is difficult to rub. Furthermore, if we move a whisker of glass across the glass plate surface, the whisker seizes and chatters as it is moved across the glass, thus demonstrating that the surface is perfectly clean.

In the removal of our protective film from the glass, plastic, metal or other support material within a high vacuum chamber we may accelerate the removal by evaporation or with an electric glow discharge by the application of heat directly to the back of the glass or other support material, the heat accelerating the evaporation. Such heat may be readily applied to the back of the glass by an electrically heated resistance coil (not shown) placed in the chamber back of the glass and its support.

We have found that glass which is dirty or glass that has been rubbed with fatty acid materials cannot be completely cleaned directly by glow discharge alone and that the contaminating materials do not evaporate readily off the surface of the glass in the high vacuum chamber. Metallic soaps which are felt to be the normal contaminants on dirty glass do not evaporate within a high vacuum at ordinary temperatures.

If desired while the glass piece or support of other materials 26 is in the high vacuum chamber and has had the protective film removed therefrom by oxidation or evaporation it may have deposited thereon within the same vacuum a mirror or other type of coating. Thus, the glass piece 26 which now has a thoroughly cleansed face or surface, such as that shown at 16 in Figure 5 and which remains in the vacuumized chamber 23, may have a reflective or other type face coating applied to the surface thereof by thermal evaporation. This thermal evaporation is preferably performed in a high vacuum by an electrically energized tungsten filament 29 which, as shown, is supported by upright posts 30 mounted upon the supporting base 20 and connected to a suitable source of electric energy. It is to be understood that the filament 29 has previously been treated with, or had applied thereto, some suitable metal or material which is to be transferred by deposition to the clean face of the glass piece or article 26. When the element 29 is electrically energized the heat therein will effect the thermal evaporation of the metal or material thereon and evaporate molecules thereof off onto the surface of the glass or plastic to produce thereupon the reflective or other type surface coating 17 shown in Figure 6.

As mirror coating materials we may thus apply aluminum, silver, chromium or other metals or zinc sulfide or lead sulfide by thermal evaporation in high vacuum of 10 to the minus 4 mm., or better. We may also apply magnesium fluoride as a low reflection coating to glass by similar thermal evaporation. There may also be applied metallic mirror coatings on the cleaned glass sheet by sputtering in a vacuum such as 0.1 to 0.01 mm., using appropriate high voltages and suitable materials, such as silver.

That the glass is protected and maintained in a clean condition after cleaning by our thin high boiling liquid films and that these films are removable by evaporation and oxidation within a high vacuum to present a perfectly clean glass surface, has been well demonstrated by the quality found in the coated articles produced. Thus, mirrors made with silver, aluminum or other metals have shown very good adherence, exceeding that previously securable, and such coatings have been free of pinholes, showing the absence of lint and dust on the glass at the time depositions were made.

As a further modification of our means of cleaning and protecting the clean glass surface we have found that we may mix organic peroxides, such as butyl peroxide or benzoyl peroxide, with the high boiling liquids comprising our protective films and that these organic peroxides aid in the subsequent removal of the films by oxidation since such materials are strong oxidizers. Where we use these materials, we add them directly to the high boiling organic liquids before applying the same to the glass.

From the foregoing it will be seen that we have provided an improved method for thoroughly cleaning the surface of glass, etc., and for applying temporary protective coatings to such thoroughly cleaned surfaces, to protect those thoroughly cleaned surfaces from contamination until such time as it is desired to apply thereto the desired reflective or other coating to produce mirrors, reflectors, or other articles in which the reflective or other coating will adhere to the glass surface to provide a permanent and pinhole-free reflective film or other coating thereon. We have also disclosed an improved method or process which includes the steps of thoroughly cleaning the glass surface, applying a temporary protective coating thereto which may be removed by oxidation and evaporation, and then applying to the bare and thoroughly cleansed glass surface a coating of reflective or other material, by deposition, resulting from thermal evaporation or sputtering of some suitable material within a vacuumized chamber.

While we have outlined one sequence of steps by which our improved method or process may be carried out and have mentioned certain materials for use in carrying out the method, as well as one kind of apparatus to be used in connection therewith, it is to be understood that, if desired, the order of the steps may be varied, other suitable materials used, and other apparatus of suitable nature employed in place of that described above, all within the purview and scope of our present invention. It will also be understood that the support material, such as glass or plastic, mentioned above, may be either transparent or opaque.

Having thus described our invention, what we claim is:

1. The method of coating a support material within a vacuum chamber, comprising the steps of subjecting the support material to a preliminary cleaning to remove foreign matter from the support material, applying a removable liquid protective covering of a high boiling liquid having a boiling range of the order of approximately 200° to 400° C. and which is non-reactive with said surface to the partially clean support surface, removing the major portion of said covering and additional foreign matter from the support surface by a rubbing operation to reduce the liquid covering to a thin film thus protecting the cleaned support material surface against contamination by foreign matter, placing the thus protected support material in a highly vacuumized chamber, removing said thin protective film by a forced evaporation within the chamber, and thereafter applying a coating by thermal evaporation to the freshly exposed cleaned surface while remaining in said vacuum chamber.

2. A method according to claim 1 wherein the coating is a mirror reflective coating.

3. A method according to claim 1 wherein the coating is a low reflection coating applied by thermal evaporation of a metal salt.

4. A method according to claim 1 wherein the thin protective film is removed within a vacuum by electric glow discharge.

5. A method according to claim 1 wherein the support material is glass.

6. A method according to claim 1 wherein the support material is plastic.

WILLIAM H. COLBERT.
ARTHUR R. WEINRICH.